United States Patent [19]
Tschudin

[11] Patent Number: 4,781,072
[45] Date of Patent: Nov. 1, 1988

[54] MECHANISM FOR CONVERTING UNIDIRECTIONAL ROTATIVE MOVEMENT INTO ALTERNATING BIDIRECTIONAL ROTATIVE MOVEMENT

[75] Inventor: Oswald Tschudin, Basel, Switzerland
[73] Assignee: Institut Straumann AG, Switzerland
[21] Appl. No.: 498,232
[22] Filed: May 26, 1983

[30] Foreign Application Priority Data

Sep. 22, 1982 [CH] Switzerland ............. 5589/82

[51] Int. Cl.[4] ............. F16H 19/00; F16H 55/17
[52] U.S. Cl. ......................... 74/318; 74/435
[58] Field of Search ............ 74/70, 318, 317, 417, 74/423, 435; 128/305.1, 310; 408/1 BD, 124

[56] References Cited

U.S. PATENT DOCUMENTS

| | | | |
|---|---|---|---|
| 900,144 | 10/1908 | Barnes et al. | 74/318 |
| 991,094 | 5/1911 | Schneider | 74/318 |
| 1,017,242 | 2/1912 | Browne | 74/318 |
| 1,161,070 | 11/1915 | Neer | 74/435 |
| 1,175,123 | 3/1916 | Bush | 74/318 |
| 1,374,751 | 4/1921 | Marten | 74/318 |
| 1,406,313 | 2/1922 | White | 384/226 |
| 1,429,361 | 9/1922 | Matalavage | 74/318 |
| 1,734,489 | 11/1929 | Jereb | 123/54 R |
| 3,010,336 | 11/1961 | Adair et al. | 74/435 |
| 3,472,082 | 10/1969 | Juvan | 74/74 |
| 4,111,208 | 9/1978 | Leuenberger | 128/310 |

FOREIGN PATENT DOCUMENTS

| | | |
|---|---|---|
| 67815 | 3/1905 | Fed. Rep. of Germany . |
| 1941557 | 6/1966 | Fed. Rep. of Germany . |
| 2936004 | 4/1981 | Fed. Rep. of Germany . |
| 595242 | 3/1925 | France . |
| 911756 | 7/1946 | France ............. 74/423 |

*Primary Examiner*—Dirk Wright
*Attorney, Agent, or Firm*—Toren, McGeady & Associates

[57] ABSTRACT

A drive shaft continuously rotating in a single direction operates to drive a driven shaft with alternating bidirectional rotative movement through a gear transmission which includes a first gear mounted on the drive shaft and second and third gears mounted on the driven shaft, with the first gear having teeth on only a portion thereof, the teeth alternately engaging the second and third gears as the drive shaft rotates. The gear teeth on the first, second and third gears have a tooth pitch $t_0$ and the teeth on the second and third gears are offset relative to each other by an arc length measured along the pitch circle of the gear which is not grater than one-fourth of the tooth pitch $t_0$.

25 Claims, 3 Drawing Sheets

MECHANISM FOR CONVERTING UNIDIRECTIONAL ROTATIVE MOVEMENT INTO ALTERNATING BIDIRECTIONAL ROTATIVE MOVEMENT

The present invention relates generally to gear drive mechanisms and more particularly to a mechanism wherein a drive shaft continuously rotating in a single direction operates to drive a driven shaft with alternating bidirectional movement.

Devices for converting unidirectional rotative movement into rotative movement having opposed alternating directions are known in the prior art for example from Swiss Pat. No. 610,753 and corresponding U.S. Pat. No. 4,111,208 which disclose different variations of mechanisms for converting the rotational movement of a motor of a drilling machine having a single rotative direction into rotative movement of a drill having alternating opposed rotative directions. In a first variant, there is provided a driving shaft with a crank, a slide and a driven shaft which is also provided with a crank. The rotational axes of both shafts are aligned with one another and the slide is displaceable at right angles relative to these rotational axes. Each of the cranks has a crank pin which is eccentric relative to the shafts and which engages in a borehole of a slide part.

In a second variant there is likewise provided a driving shaft with a crank and a slide. The latter is provided with a toothed rack which meshes with a pinion seated on the driven shaft.

In a third variant, the driving shaft is provided with a head which has an annular groove extending along a plane which is inclined relative to the rotational axis of the driving shaft. A slide, which is guided so as to be diplaceable parallel to the rotational axis of the driving shaft has a pin engaging in an annular groove as well as a toothed rack which meshes with a pinion attached to the driven shaft.

The conversion of the movement is thus effected in all of these variations by means of a slide which is displaceably guided along a straight linear path. Since forces which are also directed transversely relative to the displacement direction of the slide act upon the slide, friction losses will increase and the necessity arises for relatively expensive guide means.

Additionally, the slide and the guide means necessary for effecting guidihg action result in a relatively large, heavy mechanism. Since such a mechanism is arranged on a hand drilling machine provided for surgical purposes, large dimensions and a heavy weight of such a mechanism make the operation of a surgeon utilizing the machine more difficult.

At least in the first of the three variants discussed above, the driven shaft is, in each instance, rotated with bidirectional opposed motion around a rotational angle which, according to structural requirements, must be smaller than 180°. This produces the disadvantage that special drills having three cutting edges must be utilized in place of the usual drill having two cutting edges.

If a drilling machine is equipped with a mechanism that is constructed in accordance with one of the three types of devices discussed above, and if the drive shaft of the mechanism is rotated at a constant speed, the driven shaft will effect opposed bidirectional rotation with the angular velocity increasing in a sinusoidal manner to a maximum value and then immediately gradually decreasing again. As a result of this speed characteristic, a disadvantage arises in that the drill can be operated with a cutting speed which is appropriate for the material to be drilled only during short periods in its alternating rotative movement.

The present invention is directed toward providing a mechanism for converting rotative movements in the manner described above in order to eliminate disadvantages of known devices. In particular, the invention makes it possible to maintain at a low level the frictional losses which occur and the dimensions as well as the weight of the mechanism are also maintained low in order to reduce manufacturing costs.

Moreover, the mechanism in accordance with the invention provides a device which makes it possible to convert the unidirectional rotative movement into bidirectional rotative movement wherein the relationship between the angular velocities of the driven and driving parts during the largest possible portion of each rotational phase is maintained constant.

SUMMARY OF THE INVENTION

Briefly, the present invention may be described as a mechanism for converting unidirectional rotative movement into alternating bidirectional rotative movement comprising: a drive shaft adapted for unidirectional rotative movement; a driven shaft adapted to be driven with alternating bidirectional rotative movement; first gear means in continuous rotational connection with said drive shaft having gear teeth thereon; second and third gear means on said driven shaft having gear teeth thereon; said gear teeth on said first gear means being adapted to alternately engage said gear teeth on said second and said third gear means thereby to convert said unidirectional rotative movement of said drive shaft into alternating bidirectional movement of said driven shaft; said gear teeth on said first, second and third gear means having a tooth pitch $t_0$, said gear teeth on said second and third gear means being offset relative to each other by an arc length measured along their pitch circles which is not greater than one-fourth of said tooth pitch $t_0$.

Thus, in accordance with the present invention, mutually corresponding positions of the teeth of the second and third driven gear means with a tooth pitch $t_0$ are offset relative to one another by an arc measured on their pitch circles by projecting two positions on said second and third gear means on one another or to make them overlap by means of displacement without rotation, wherein $$0 < |a| \leq t_0/4$$

wherein a is the arc by which the teeth are offset, and wherein the driven one of said second and third gear means not engaged at the time with the driving toothed first gear means leads the engaged one of said second and third gear means by said arc a.

In a preferred embodiment of the invention, the offset arc a is formed to be 5% to 20%, and preferably 10% to 15%, of the tooth pitch $t_0$. The number of teeth in the toothed sector of the driving first gear means is preferably measured in such a manner that the driven rotating element cannot rotate in any rotational position of the driving rotating element without the driving rotating element moving.

Furthermore, the invention is directed toward utilization of the mechanism wherein the device may be used for winding a spool which is driven with bidirectional rotative movement.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
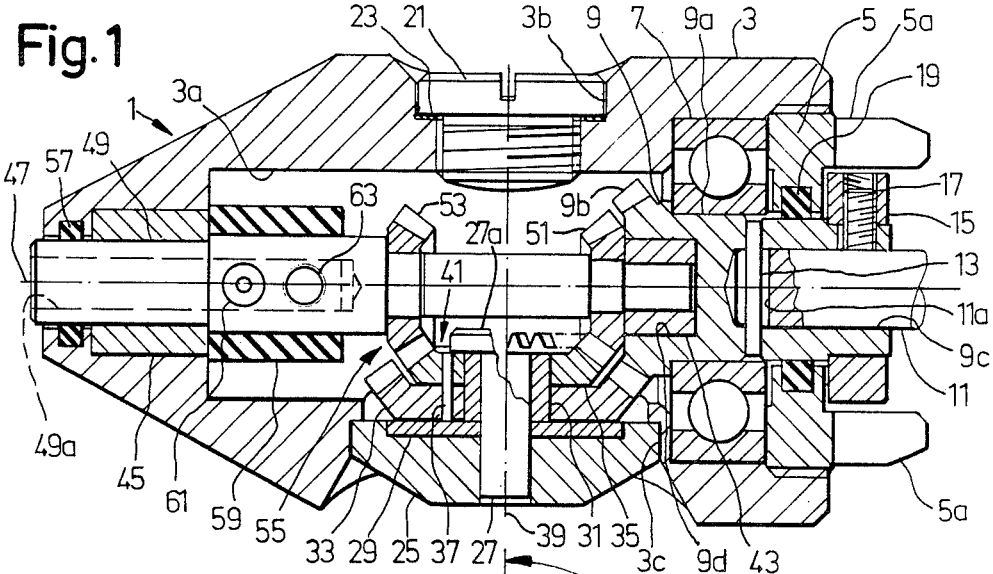
FIG. 1 is a longitudinal sectional view taken through a mechanism in accordance with the invention which is attachable to a drilling machine or hand drill.
Figure 2:
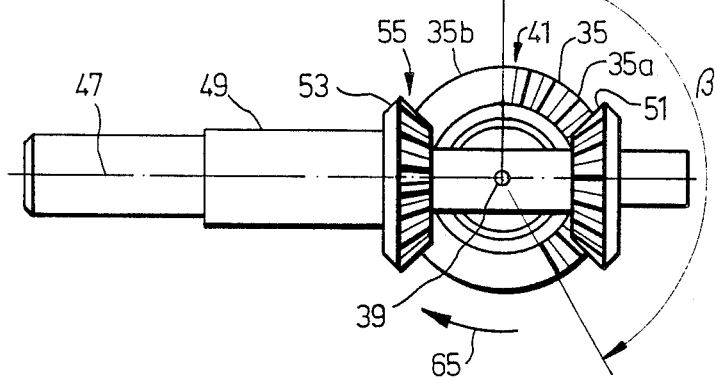
FIG. 2 is a partial top view showing in greater detail part of the driving mechanism of the invention.

Referring now to the drawings, and more particularly to FIGS. 1 and 2, there is shown the structure of a mechanism in accordance with the invention, the mechanism in its entirety being designated by reference numeral 1. The mechanism 1 is a gear unit operative to convert unidirectional rotational movement into rotational movement with alternating directions. The mechanism 1 includes a housing 3 which is generally symmetrical relative to its longitudinal axis and which is basically composed of a cylindrical part shown to the right in FIG. 1 and a conical part shown toward the left, the conical part generally being shaped toward a reduced end.

The interior of the housing 3 is formed with a longitudinal opening 3a and with a pair of mutually opposed radial openings 3b and 3c, the radial openings extending to the longitudinal opening.

The longitudinal opening 3a is formed by means of a stepped borehole having a retaining ring 5 screw-fitted into the end section of the housing 3 remote from its conical portion. The retaining ring 5 has an external thread which detachably engages internal threads formed in the housing 3. Additionally, the ring 5 is formed with fingers 5a which extend in the direction of the longitudinal axis of the housing 3, the fingers 5a projecting away from the housing and the ring 5 supporting a ball bearing 7 inserted into the longitudinal opening 3a.

A rotating element 9 is provided with a shaft journal 9a rotatably supported in the ball bearing 7 as well as with a bevel gear 9b. Furthermore, the rotating element 9 is also provided at both ends with blind holes 9c and 9d, with a driving shaft 11 having a radial recess 11a at one end thereof projecting into the blind hole 9c. The drive shaft 11 is connected with the rotating element 9 at the shaft journal 9a by a pin 13 which extends through the recess 11a and which is inserted into appropriate openings formed in the shaft journal 9a.

A ring 15 is arranged on the end of the shaft journal 9a, which end projects out of the housing 3 and the retaining ring 5. The ring 15 is clamped to the drive shaft 11 by a clamping screw 17 which extends through a radial borehole in the shaft journal 9a. The retaining ring 5 is sealed inwardly relative to the shaft journal 9b by a sealing ring 19.

A closure screw 21 and a sealing ring 23 are inserted into an opening 3b formed in the housing 3. A round disk 25 is inserted and rigidly fastened, for example by a pressed fit, in fluid-tight engagement in the outermost part of the opening 3c of the housing 3. A bearing bolt 27 extending from the housing interior outwardly so as to be in fluid-tight engagement, is rigidly fastened, for example, by a pressed fit, into the disk 25. The end of the bearing bolt 27 projecting into the interior of the housing 3 is formed with a head 27a and a ring 29 is arranged on the interior side of the disk 25 with a sleeve 31 extending between the ring 29 and the head 27a of the pin 27. The ring 29 and the sleeve 31 are composed of a self-lubricating material, e.g. on a metal base, thereby enabling good sliding movement for rotation of the sleeve 31 around the bolt 27.

Arranged on the sleeve 31 are bevel gears 33 and 35 which are rotatably fixed with one another by means of at least one pin 37, the bevel gears 33 and 35 being also rigidly fastened on the sleeve 31. The bevel gears 33 and 35 are rotatable around an axis 39 and together they form a rotating element generally designated by reference numeral 41. The rotating element 41 will hereinafter be referred to as a first or driving rotating element.

The bevel gear 33 meshes with the bevel gear 9b formed on the rotating element 9. As will be seen from FIG. 2, the bevel gear 35 has a toothed sector 35a which extends over only a part of the circumference of the bevel gear with a toothless sector 35b extending over the balance of the circumference of the gear 35, the toothed sector 35a extending over an angular distance defined by the angle $\beta$. Of course, the toothless section 35b of the gear 35 extends over an angle of $360° - \beta$.

A bush 43 is inserted in the blind hole 9d and a bush 45 is inserted in a part of the longitudinal opening 3a located in the area of the conical portion of the housing 3. The two bushes 43, 45 are, for example, more or less fixedly pressed in place and they are composed of a self-lubricating material on a metal base thereby enabling good sliding movement.

A shaft 49 having an axis 47 is rotatably supported in the two bushes 43, 45 with the axis 47 also forming the longitudinal axis of the housing 3 and of the bevel gear 9b and extending at right angles to the axis 39 of the pin 27.

Two bevel gears 51 and 53 are rotatably and axially fixed on the shaft 49 on axially opposite sides of the axis 39. The bevel gears 51 and 53 may be detachably connected with the shaft 49 and they may, for example, be wedged on the shaft 49 to secure axial fixing thereof. For example, the bevel gear 51 may be axially affixed relative to the shaft 49 by engagement between a shoulder formed on the shaft and the bush 43. The bevel gear 53 may be axially secured by abutment against a shoulder on the shaft 49 and by other auxiliary means.

Together with the toothed bevel gears 51 and 53, the shaft 49 forms a rotating element 55 which is the driven rotating element of the mechanism of the invention and which will hereinafter be referred to as the second or driven rotating element 55. The two bevel gears 51 and 53 will henceforth also be referred to as the driven bevel gears or gear wheels and they are formed with a toothed crown or gear ring extending over the entire periphery thereof, the gears 51,53 being arranged on opposite sides of the axis 39 in such a manner that during rotation the bevel gear 35 alternately achieves driving engagement with the bevel gears 51 and 53 in a manner to be described more fully hereinafter.

The longitudinal opening 3a is provided with an annular groove at the conical end of the housing 3 into which there is inserted a sealing ring 57 which seals the interior of the housing at the end of the shaft 49. A rubber elastic collar or packing 59 is arranged on the shaft 49 between the bush 45 and the bevel gear 53. The shaft 49 has a circular cylindrical blind hole 49a at the end thereof which projects on the housing 3 and in the area of the collar 59 there is provided a radial hole with a lock member 61 which projects into the blind hole 49a in order to enable a tool or other device to be held in operating position therein. In the area of the collar 59, the shaft 49 is provided with three other radial holes distributed uniformly over its circumference with lock member 63 being arranged in these holes, the lock members comprising, for example, balls which may be partially pressed into the blind hole 49a by means of the collar 59 with a resilient force. In addition, the collar 59 seals the hole containing the lock member 61 and the holes containing the lock members 63 and accordingly the blind hole 49a is also sealed against the interior of the housing.

During the operation of the mechanism depicted in FIGS. 1 and 2, the shaft journal 9a of the rotating element 9 is driven with a unidirectional rotation around the axis 47 and it may be driven, for example, with a constant number of revolutions per minute.

The bevel gear 9b transmits the rotational movement of the rotating element 9 to the bevel gear 33 of the rotating element 41 and accordingly there is also rotated the bevel gear 35 which, as previously described, is formed with a toothless sector 35b. The rotating element 41 thus carries out rotational movement with only one direction of rotation, that is in the rotational direction designated by the arrow 65 shown in FIG. 2. Since the toothed sector 35a of the bevel gear 35 now alternately engages with the two bevel gears 51 and 53, the rotating element 55 formed by the shaft 49 and by the bevel gears 51, 53 alternately rotates in different rotational directions.

Figure 3:
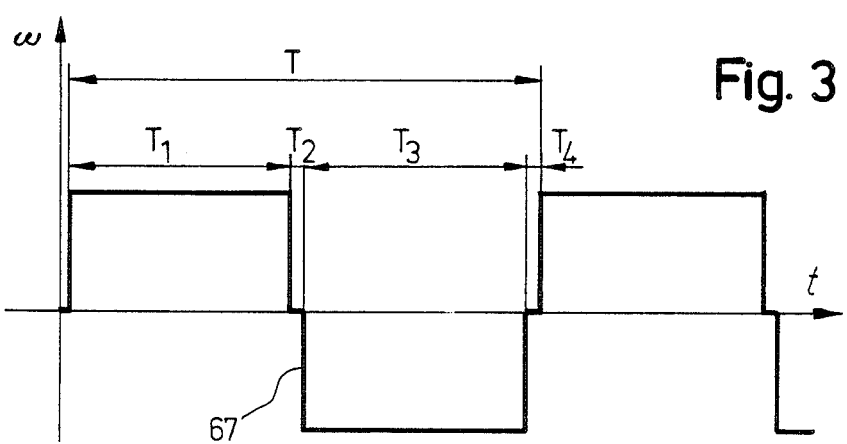
FIG. 3 is a graph showing angular velocity of the driven member against time shown on a larger scale.

In FIG. 3 there is plotted the angular velocity $\omega$ of the rotating element 55 plotted against time t. The rectangular curve 67 in the graph of FIG. 3 shows somewhat schematically the angular velocity $\omega$ of the driven rotating element 55 in the case where the driving rotating element 41 is driven at a constant angular velocity. A positive angular velocity $\omega$ of the rotating element 55 occurs when the toothed sector 35a of the bevel gear 35 engages with the bevel gear 51. A negative value of angular velocity $\omega$ occurs when the toothed portion of the gear wheel 35 engages the bevel gear 53. Of course, it will be apparent that positive and negative values are arbitrarily selected.

It is assumed that the driven rotating element 55 shifts its rotational direction precisely at the point in time t=0 and is stationary for a very short period of time after which the toothed sector 35a of the bevel gear 35 engages the bevel gear 51. The angular velocity $\omega$ of the driven rotating element 55 then increases rapidly to its positive maximum value and retains this velocity during a time period interval $T_1$. When the toothed sector 35a of the bevel gear 35 has disengaged from the bevel gear 51, the angular velocity $\omega$ of the driven rotating element 55 decreases to 0 and retains this stationary condition for a time period $T_2$. When the teeth of the toothed sector 35a engage with the teeth of the bevel gear 53, the angular velocity $\omega$ achieves it maximum negative value and retains this value during a time period interval $T_3$. Subsequently, the driven rotating element 55 again undergoes a period of time $T_4$ during which it is stationary after which a new cycle begins again. The time period of a full cycle of the bevel gear 35 and a full period of the driven rotating element 55 is designated as T.

The reversing gearing unit 1 thus makes it possible to convert the driving motion of the driving rotational element 41 having a unidirectional rotating mode into reversing backward and forward bidirectional rotation of the driven rotating element 55. This action occurs in such a manner that the relationship between the angular velocities of the driving and driven rotating elements 41, 55 is practically constant during the entire rearward and forward rotation of the driven rotating element 55. The time period $T_1$ is equal to the time period $T_3$ and the time period $T_2$ is equal to time period $T_4$, the periods $T_2$ and $T_4$ being represented on an exaggerated magnitude for the sake of clarity in the graph of FIG. 3. At a constant angular velocity of the driving rotating element 41, each time period $T_1$ and $T_3$ constitutes at least 48% and preferably approximately 49% of the total time interval T with the switchover time intervals $T_2$ and $T_4$ each being approximately 1% of the total interval T.

In order that the operational behavior described above may be achieved and so that the reversing gear unit will operate properly, the conical toothed gear wheels or bevel gears 35, 51 and 53 must fulfill certain specific conditions.

First, it is advisable that the teeth of the bevel gear 35 engage in the teeth of the bevel gears 51 and 53 with only a small amount of play.

Additionally, some further designations to be explained hereinafter may operate to provide a fuller disclosure of the invention. Let it be assumed that $z_{35}$ denotes the full, even number of gear teeth which the bevel gear 35 would have if the gear teeth were to extend over its entire circumference. Let the actual number of teeth provided in the sector 35a be designated by $z_s$. The pitch of the bevel gear 35 and of the bevel gears 51 and 53 is designated $t_0$. This represents the arc of the pitch circle which is between two right or left flanks of adjacent teeth. The term "engagement factor" or "overlapping degree" is designated $\epsilon$ and this factor is intended to mean the quantity of teeth of the gear wheel 35 which in each instance engage with one of the gear wheels or bevel gears 51, 53. The value of the engagement factor $\epsilon$ rounded off to the next whole number is designated as E. The engagement factor $\epsilon$ is usually equal at least to 1.3 and for the reversing gear unit it is preferred if this factor is at least 1.5 or for example a maximum of 2.

Thus, the quantity of teeth in sector 35a is given by the following equation:

$$z_s = (z_{35}/2) - E \qquad (1).$$

Figure 4:
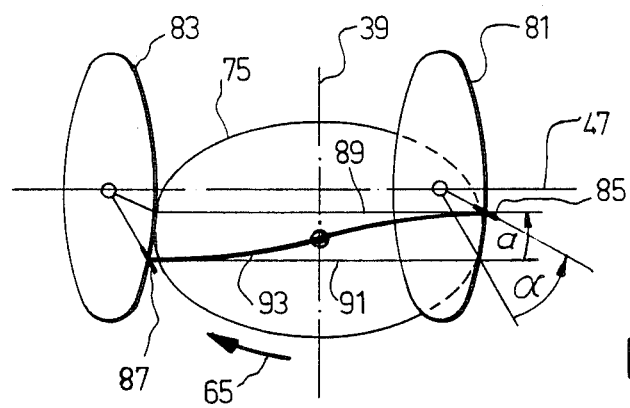
FIG. 4 is a graphic representation of the pitch circles of the of the invention shown in FIG. 2.

The two conical toothed gear wheels or bevel gears 51 and 53 have the same number of teeth and this number of teeth may be even or odd. The bevel gears 51, 53 are arranged on the shaft 49 in such a way that their teeth are somewhat offset relative to one another when one projects the two gear wheels or bevel gears one on the other in a direction parallel to the rotational axis 47 or when they are overlapped in an imaginary way by means of non-rotating axial displacement. This rotational twist or offset which is also indicated in FIG. 2 is explained in greater detail with reference to FIG. 4. In FIG. 4 there are shown the axes 39 and 47, a pitch circle 75 of the bevel gear 35, a pitch circle 81 of the bevel gear 51 and a pitch circle 83 of the bevel gear 53 with the centers of the pitch circles also being shown. Moreover, a position or point 85 and 87 is marked respectively on each of the two pitch circle 81 and 83. These points or positions designate mutually corresponding locations of a pair of teeth on the opposed gears, which locations are on the pitch circles, e.g. intersecting points of the tooth center lines with the pitch circles. Moreover, if straight lines 89 and 91 are drawn parallel to the axis 47 it will be noted that these lines will lie in different planes extending through the axis 47 and that they intersect the two pitch circles 81, 83. The line 89 extends through a position 85 on the pitch circle 81 of the gear 51 and the line 91 extends through a position 87 on the pitch circle 83 for the gear 53. The two straight lines 89 and 91 thus represent projected positions 85 and 87, the position 85 being projected onto the pitch circle 83 or gear 53 and the position 87 being projected onto the pitch circle 81 or the gear 51. It will be noted from FIG. 4 that the two positions 85 and 87 are angularly offset relative to each other by a distance represented by an arc a measured on the pitch circles 81 or 83 and by a central angle α measured in the centers of the two pitch circles 81, 83 respectively which angle will also be designated as a phase angle in the following description.

In FIG. 4 there is shown a further line 93 which connects the two positions 85 and 87. and which extends along a rotational cylindrical surface defined by the two pitch circles thereby forming a part of a helical line. The line 93 extends in the manner of a right-handed thread. The bevel 35 rotates during operation in the direction of the arrow 65 which taken in a viewing direction seen from the intersecting point of the axes 39 and 47, corresponds to a clockwise rotational movement. Moreover, when viewing the bevel gear 53 from the aforementioned intersection point, the position 87 of the bevel gear 53 is offset counterclockwise by an arc a relative to the position 85 of the bevel gear 51. When viewing the bevel gear 51 from the intersecting point, the position 85 of the bevel gear 51 is accordingly offset in a counterclockwise direction through the arc a relative to the projection of the position 87.

It should be noted here that the gear wheel 35 can also be rotated in the opposite direction whereby the bevel gears 51 and 53 would then be offset relative to one another in such a manner that the line corresponding to the line 93 would form part of a left-handed thread.

In operation the toothing of that driven bevel gear 51 or 53 which momentarily is not engaged with the driving gear wheel 35 is, in each instance, displaced forwardly during operation in accordance with the phase angle, i.e. advancing in the instantaneous moving direction by the arc a relative to the other bevel gear 51 or 53, respectively. The length of the arc a should be greater than zero and at most be equivalent to $t_0/4$ and is preferably smaller than $t_0/4$ so that the following equation applies:

$$0 < |a| \leq t_0/4$$

The arc a may be at least 5% and preferably at least 10% of the tooth pitch $t_0$ and it may, for example, be 15% to 20% of the pitch $t_0$.

When the reversing unit is constructed in the manner described above and particularly if the requirements expressed in the formulas (1) and (2) are fulfilled, and if the bevel gears 35,51,53 have a normal tooth flank play, the driven rotational element 55 cannot freely rotate by itself in any rotational position of the driving rotating element 41. The bevel gears 35, 51 and 53 can then also never achieve a rotational position relative to one another where the gear unit is blocked, i.e. is jammed. Naturally, the result of the tooth displacement or offset is that the driving rotating element can be driven only in one rotational direction. Should a drive in the reverse direction be desired, the relative positions of the driven gear wheels must be adjusted.

As already mentioned, the two bevel gears 51 and 53 have the same quantity or number of teeth $z_{51,53}$. The amount or absolute value of the positive or negative rotation angle $\phi$ around which the driven rotating element 55 is alternately rotated in one or the other rotational direction, is given by means of the following equation where $\phi°$ is the rotational angle measured in degrees:

$$|\phi°| = 180\, z_{35}/z_{51,53} \qquad (3).$$

Figure 5:
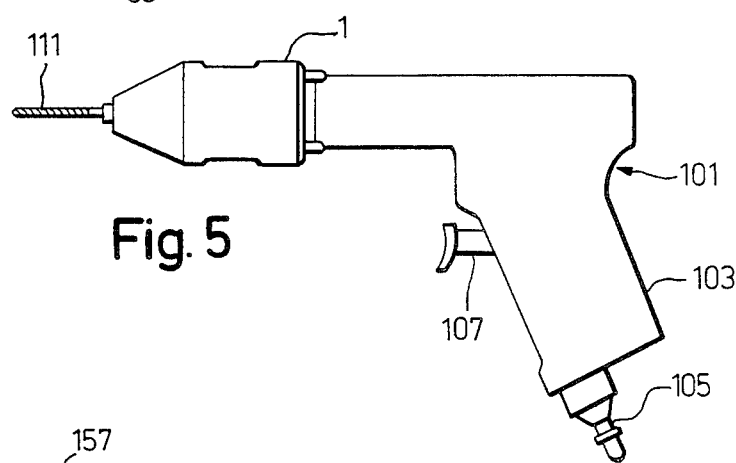
FIG. 5 is a drilling device having the mechanism of the invention operatively mounted therewith.

The mechanism 1 may be utilized for driving a twist or spiral drill bit, for example, and it may be detachably connected on a drilling machine or hand drill. In FIG. 5 there is shown a drilling device which comprises a hand drill 101 provided for use in bone surgery with a housing 103, a compressed air connection 105, a compressed air motor and at least one manually movable actuation mechanism 107. With the latter, the motor may be energized and deenergized and the number of motor revolutions may preferably be changed in a continuous manner. The drive shaft 11 shown in FIG. 1 may be formed by means of the shaft of the hand drill 101 which shaft may also be used for holding a detachable drill chuck. Moreover, the fingers 5a are constructed so that they engage in recesses of the drill housing 103 and can thereby connect in relatively fixed rotative engagement the housing 3 with the housing 103 of the hand drill 101.

A twist drill bit 111 having a cutting part with two cutting edges at the forward end thereof and having a shaft which can be inserted into the hole 49a so as to be detachably connected with the shaft 49 is shown in FIG. 4. In order to achieve detachable connection, the general cyclindrical drill shaft is provided with an annular groove at its end wherein the three lock member 63 may engage. Additionally, the drill shaft may have a flattened portion at which the lock member 61 may engage thereby connecting the shaft 49 with the drill bit 111 in mutually rotating engagement.

Each of the cutting edges is rotated alternately in opposed directions through a sector whose central angle equals the rotational angle $\phi$. The rotational angle should therefore be at least equal to or preferably larger than 180° so that the two sectors just mentioned will overlap. On the other hand it is advisable for drilling that the rotational angle $\phi$ be at most 360° and preferably less than 360°. The rotational angle $\phi$ can, for example, be within the range between 200° and 300°.

The desired operation parameters of the invention may be accomplished in accordance with formula (3). By determining the corresponding number of teeth for the gears 35, 51 and 53. For example, if $z_{35}=24$ teeth, $z_s=10$ teeth and $z_{51,53}=16$ teeth. Then the angle $\phi$ would be approximately 150° and the rotational angle $\phi$ would be approximately 270°. The engagement factor $\epsilon$ may have a magnitude of, for example, 1.63 so that $E=2$. The arc a may then be about 0.18 $t_0$.

During drilling of a hole, the angular velocity of the drill bit 111 will be the same as the angular velocity $\omega$ of driven rotating element 55 and it will thus be maintained constant during the periods $t_1$ and $t_3$. This makes it possible to adjust the number of revolutions of the drill in such a way that the drill in each instance will have a favorable cutting speed during the entire rotational movement during which cutting occurs.

When a hole is drilled in the bone during a surgical procedure, it may occur that after drilling through the bone, the drill may enter soft tissue and tear such tissue loose when the drill tip exits from the bone. The backward and forward rotations of the drill bit 111 prevent winding about the drill and consequent tearing of soft tissue parts.

Of course, it will be apparent to those skilled in the art that other drill securing and locking devices could be utilized without departing from the scope of the invention.

Since the movable parts of the mechanism 1 necessary for converting rotative movement are all rotatably supported and formed by means of shafts and toothed gear wheels or gears, the efficiency of power transmission in the conversion is quite favorable. Moreover, the mechanism 1 may be constructed so as to be smaller and lighter relative to the output which it must transmit so that the work of the surgeon during the use of the drilling device shown in FIG. 5 will not be impeded. Since all the bearings and gears are housed in the interior of the housing 3 which is sealed and closed off from its surroundings, the mechanism can also be sterilized and be kept sterile with little expense. If necessary, the interior of the housing 1 may be made accessible by removing the sealing or closure screw 21.

Figure 6:
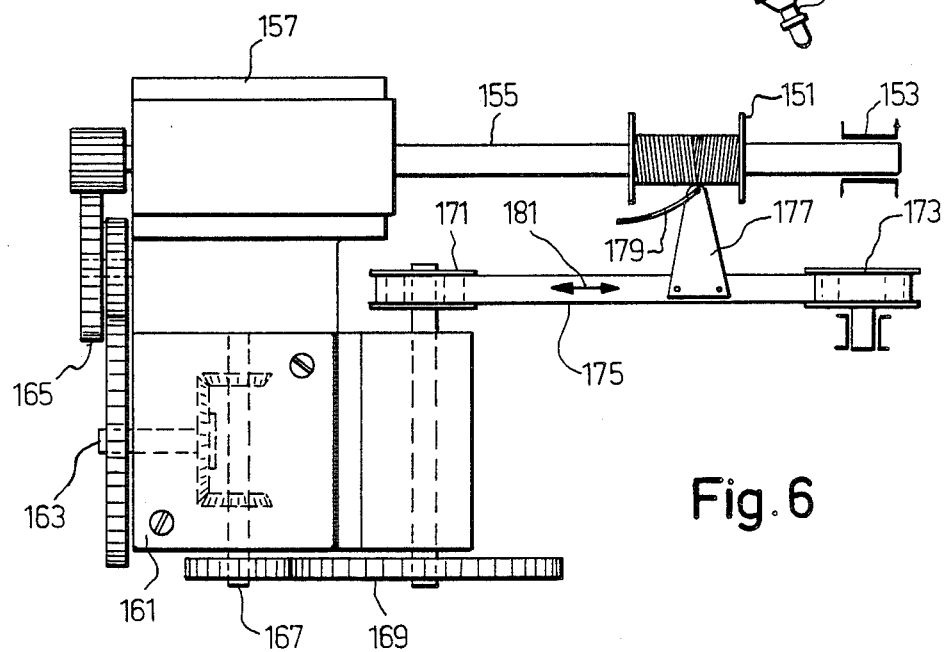
FIG. 6 is a winding or coiling device having the mechanism of the invention operatively associated therewith.

Another application of the mechanism of the invention is depicted in FIG. 6 which shows a spool winding device provided with a frame and with means for detachably supporting a rotating spool or bobbin 151 which is mounted on a shaft 155 rotatably supported at one end by a bearing 153 and driven by a drive mechanism 157 having, for example, an electric motor. A mechanism 161 having a housing fastened to the frame of the winding device includes a reversing gear unit for converting unidirectional rotational movement into bidirectional alternating rotational movement. The reversing gear unit has three conical toothed gear wheels or bevel gears which correspond to the bevel gears 35, 51 and 53 with the bevel gear corresponding to the gear 35 being arranged on a drive shaft 163. The drive shaft 163 is connected with the drive mechanism 157 by means of the gear unit 165 through replaceable toothed gear wheels. The driven shaft 167 of the reversing unit of the mechanism 161 is operatively connected with a wheel 171 through a gear unit 169 which may, for example, be a spur gear or a worm gear. The wheel 171 is rotatably supported about an axis which extends perpendicularly to the rotational axis of the spool 151. The wheel 171 together with another rotatable wheel 173 supports a belt 175 extending parallel to the axis of rotation of the spool 151. A guide mechanism 177 is fastened to the belt 175 and serves to guide a flexible element 179 which is to be wound about the spool 151. The flexible element may, for example, be an insulated electrical wire.

When a wire or similar strand of material is wound on the spool 151 during operation of the winding device, the drive mechanism 157 rotates the shaft 155 carrying the spool 151 as well as the driving shaft 163 of the mechanism 161. The drive shaft 163 is rotated with a unidirectional rotational motion and it may be rotated at a constant or variable speed. The driven shaft 167 of the mechanism 161 then will be driven with an alternating bidirectional rotational movement so that the belt 175 of the guiding mechanism 177 will be moved in a reciprocating fashion indicated by the arrow 181 in directions parallel to the rotational axis of the spool. The displacement speed of the guiding mechanism is determined in such a manner that the windings of the material 179 will lie adjacent one another without intervening spaces in each layer of the coil that is formed. Furthermore, the displacing distance of the guiding mechanism 177 is equivalent to the length of the spool so that in each instance the guide means changes direction after winding of a single layer on the spool. It is of significant advantage that with the present invention the guide mechanism 177 changes direction very quickly as indicated from FIG. 3 and will accordingly practically always produce the same winding characteristics during each backward and forward movement.

The mechanisms 1 and 161 for converting the rotational movement may be modified in various respects. For example, two conical toothed gear wheels 51, 53 can be formed together with the shaft 49 as a unitary body. Morever, the bevel gear 35 may have three uniformly distributed sectors with teeth thereon and three toothless sectors in place of the two sectors 35a and 35b. The gear 35 might also have a different uneven number of toothed and toothless sectors, respectively. Then, instead of formula (1) applying, the following more general formula would apply:

$$z_s=(z_{35}/2n)-E \qquad (4)$$

wherein n designates the number of toothed sectors of the gear wheel 35.

Figure 2A:
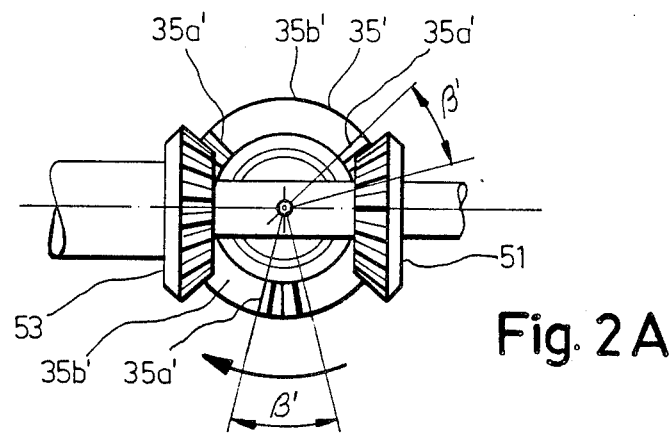
FIG. 2A is a similar view showing another embodiment of part of the driving mechanism.

As previously indicated in accordance with the preferred embodiments of the invention, n is an uneven integer, preferably equal to 1 or 3. In an embodiment of the invention shown in FIG. 2A wherein $n=3$, there is provided a gear wheel 35' having three toothed sectors 35a' and three toothless sectors 35b'. The sectors 35a' each extend over an angle $\beta'$ which is for instance 30° and the toothless sectors 35b' each extend over an angular distance of for instance 90°.

In this embodiment, $z_s=2$ so that each toothed sector 35a' has two teeth. The driven gears 51, 53 are each provided with sixteen teeth. However, one could also provide gear wheels with more teeth.

Thus, it will be seen that in accordance with the present invention there may be constructed a mechanism which will operate as a reversing gear unit having a driving rotating element 41 with a bevel gear 35 provided with a toothed sector 35a and a toothless sector 35b together with a driven rotating element 55 having a shaft 49 with a pair of bevel gears 51, 53 which are affixed with the shaft 49. The key part of the driving rotating element 41 is dimensioned in such a way that it will alternately achieve engagement with one of the two bevel gears 51, 53 of the driven rotating element during rotation of the driving rotating element 41. In accordance with the invention, the mutually corresponding teeth of the two bevel gears 51, 53 of the driven rotating element 55 are offset relative to one another on the pitch circles by an arc which is smaller than a fourth of the tooth pitch of the bevel gears. The mechanism in accordance with the invention enables the achievement of conversion of unidirectional rotative motion into bidirectional alternating rotative motion while avoiding the possibility of jamming or malfunction of the gear unit.

While specific embodiments of the invention have been shown and described in detail to illustrate the application of the inventive principles, it will be understood that the invention may be embodied otherwise without departing from such principles.

What is claimed is:

1. A mechanism for converting unidirectional rotative movement into alternating bidirectional rotative movement comprising:
   a drive shaft adapted for unidirectional rotative movement
   a driven shaft adapted to be driven with alternating bidirectional rotative movement;
   first gear means in continuous rotational connection with said drive shaft having gear teeth thereon;
   second and third gear means on said driven shaft having gear teeth thereon;
   said gear teeth of said first gear means being adapted to alternately engage said gear teeth on said second and third gear means in order to alternately drive said driven shaft in opposed rotative directions;
   said gear teeth on said first, said second and said third gear means having a tooth pitch $t_0$ with the gear teeth on said second and third gear means being offset relative to each other by an arc-length measured along pitch circles of said second and third gear means, which arc-length is not greater than one-fourth of said tooth pitch $t_0$.

2. A mechanism for converting unidirectional rotative movement into alternating bidirectional rotative movement comprising a driven shaft adapted to be driven with alternating bidirectional rotative movement; a drive shaft undergoing unidirectional rotative movement for driving said driven shaft; and transmission means interposed between said drive shaft and said driven shaft, said transmission means comprising first, second and third gear means, said first gear means being in continuous rotational connection with said drive shaft and operating as a driving gear wheel, said second and said third gear means comprising equally sized gears arranged in continuous rotational connection with said driven shaft, said first gear means having at least one section thereof not containing gear teeth, said first, said second and said third gear means being arranged in such a way that during rotation of said drive shaft said first gear means alternately engages with said second and said third gear means and that mutually corresponding positions of teeth of said second and third gear means having a tooth pitch $t_0$ are offset relative to one another by an arc a measured on their pitch circles when one projects the two said positions on one another by displacement thereof without rotation, wherein $$0 < |a| \leq t_0/4$$

and wherein the second or third gear means, not engaged at the time with said first gear means leads the engaged one of said second or third gear means by said arc a.

3. A mechanism according to claim 2 wherein said first gear means comprises a driving conical toothed gear wheel including a part thereof containing gear teeth and wherein said second and third gear means comprise two diametrically oppositely located driven conical toothed gear wheels each having a full toothed crown and each being rotatively fixed on said driven shaft to alternately engage when driven with said driving conical toothed gear wheel.

4. A mechanism according to claim 2 wherein said driving toothed gear wheel is formed with a single toothed sector and with a single toothless sector.

5. A mechanism according to claim 3 wherein said driving toothed gear wheel is formed with said part thereof containing gear teeth comprising a number n of separate sectors without gear teeth, said driving toothed gear wheel also comprising an equal number n of sectors containing gear teeth, said driving toothed gear wheel being structured and dimensioned so that there is a total number of teeth which hypothetically could be formed therein which number is $z_{35}$, so that the number of teeth actually formed on each of said sectors containing gear teeth is $z_s$, so that said number n is an uneven integer, so that E is a factor representing a value rounded off to a next higher whole number of a quantity of teeth of said driven toothed gear wheels, and wherein said number $z_s$ is in accordance with the following equation $$z_s = (z_{35}/2n) - E.$$

6. A mechanism according to claim 2 wherein said arc a is not less than $0.05\, t_0$.

7. A mechanism according to claim 2 wherein said arc a is not less than $0.1\, t_0$.

8. A mechanism according to claim 2 wherein said arc a is between $0.15\, t_0$ and $0.20\, t_0$.

9. A mechanism according to claim 2 arranged in operative connection with a motor for driving a twist drill having two cutting edges, said twist drill being driven by said mechanism in different rotational directions around a rotational angle having an absolute value which is greater than 180°.

10. A mechanism according to claim 9 wherein said rotational angle is between 200° and 300°.

11. A mechanism according to claim 2 defining an engagement factor between said first gear means and said second and third gear means wherein said at least one section of said first gear means not containing gear teeth is formed with an uneven number n of sectors devoid of gear teeth, said first gear means also comprising the same number n of sectors containing gear teeth, said first gear means being structured and dimensioned so that there is a total number of teeth which hypothetically could be formed thereon which number is $z_{35}$, so that the number of teeth actually formed in each of said at least one sector containing teeth $z_s$, so that E is a next higher whole number beyond said engagement factor, and wherein said number $z_s$ is in accordance with the following equation $z_s = (z_{35}/2n) - E.$ 12. A mechanism according to claim 1 wherein said first gear means comprise a gear wheel formed with a first portion having gear teeth thereon and with a second portion devoid of gear teeth.

13. A mechanism according to claim 12 wherein said first and second portions each comprise a single continuous angular sector of said gear wheel.

14. A mechanism according to claim 12 wherein said first and said second portions each comprise an odd number of angular sectors, with each of said angular sectors of said first and said second portions being alternately arranged.

15. A mechanism according to claim 14 wherein said odd number is 3.

16. A mechanism according to claim 2 wherein said at least one section not containing gear teeth is composed of a single continuous angular sector, said first gear means also comprising a single continuous angular sector having gear teeth formed thereon.

17. A mechanism according to claim 2 wherein said first gear means comprise at least three separate angular sectors having gear teeth thereon, with each of said three sectors containing gear teeth being located between a pair of adjacent sectors not containing gear teeth.

18. A mechanism according to claim 5 wherein $n=1$.

19. A mechanism according to claim 5 wherein $n=3$.

20. A mechanism according to claim 12 wherein $n=1$.

21. A mechanism according to claim 12 wherein $n=3$.

22. A mechanism according to claim 2 wherein the amount of said displacement is smaller than one quarter of said tooth pitch $t_0$.

23. A mechanism according to claim 2 wherein the driven gears have the same number of gear teeth and the same pitch circle, and wherein the number of teeth that the driving toothed gear would have if the gear teeth were to extend over its entire circumference is even.

24. A mechanism according to claim 23 wherein the gears are bevel gears and the driven gears are mounted on a rotational drive shaft to be secure against relative rotation and are displaced in phase relative to each other by said offset about the rotational axis of said drive shaft.

25. A mechanism according to claim 24 wherein the driven shaft is provided at one side of the two driven gears with fastening means for detachable fastening to a shaft of a drill bit and the transmission means further comprises a fourth bevel gear arranged co-axially with the drive gear for rotation therewith, and a fifth bevel gear disposed at the other side of the two driven gears and drivably engaging the fourth bevel gear, the fifth bevel gear being rotatable about the same axis as the driven shaft and being releasably and drivingly couplable with a drive shaft of a prime mover.

* * * * *